UNITED STATES PATENT OFFICE.

ADOLPH SCHRADER, OF CHICAGO, ILLINOIS.

BREAD.

SPECIFICATION forming part of Letters Patent No. 373,690, dated November 22, 1887.

Application filed September 16, 1887. Serial No. 249,830. (No specimens.)

*To all whom it may concern:*

Be it known that I, ADOLPH SCHRADER, a citizen of the United States, residing at Chicago, in the county of Cook and State of Illinois, have invented a new and useful Improvement in Bread, of which the following is a specification.

It is my object to provide as a new article of food bread composed in part of banana pulp. As is well known, the edible varieties of the banana are highly nutritious, forming the staple food of many tropical tribes, and in combining a proportion of the pulp with the common ingredients of bread I produce an article of food pleasant to the taste, wholesome to a high degree, and economical where the fruit is comparatively inexpensive.

My invention consists, broadly, in combining the pulp of banana with meal or flour in the manufacture of bread.

One very desirable variety of my improved bread containing banana pulp, wheat-flour, and milk as the main ingredients I prefer to make in the following manner: The proportions are, substantially, banana pulp, one pound; flour, one and one-half pound; milk, one-fourth of a pound. Sufficient yeast is added for the usual purpose. I do not, however, limit myself to these proportions, as it is quite obvious that they may be changed to suit different tastes.

The banana pulp is pounded into a paste and mixed, with the flour, milk, and yeast, into a dough, which is kneaded and baked in the usual manner. The result is a compact loaf of moist bread capable of retaining its moist or fresh condition for a length of time far beyond the time when ordinary wheat-bread would become stale and unpalatable; and it possesses, besides, a pleasant flavor and nourishing properties much greater than is to be found in ordinary bread.

Banana pulp may be mixed in the same manner with the flour or meal of other grain with like valuable results.

What I claim as new, and desire to secure by Letters Patent, is—

1. As a new article of manufacture, bread containing banana pulp and meal or flour, substantially as described.

2. As a new article of manufacture, bread comprising a mixture of banana pulp, meal or flour, and milk, in suitable proportions, substantially as described.

ADOLPH SCHRADER.

In presence of—
J. W. DYRENFORTH,
CHAS. E. GORTON.